United States Patent [19]

Lefler, III

[11] Patent Number: 4,681,808
[45] Date of Patent: Jul. 21, 1987

[54] ADHESION OF SILICONE ELASTOMER TO POLYURETHANE

[75] Inventor: Harold V. Lefler, III, Sanford, Mich.

[73] Assignee: Dow Corning Corporation, Midland, Mich.

[21] Appl. No.: 914,420

[22] Filed: Oct. 2, 1986

[51] Int. Cl.[4] .......... B32B 27/00; B32B 5/14; B32B 9/04; B05D 1/36

[52] U.S. Cl. .......... 428/425.5; 427/412.1; 428/308.4; 428/319.3; 428/447; 428/448

[58] Field of Search .......... 427/412.1, 387; 428/308.4, 319.3, 425.5, 447, 448

[56] References Cited

U.S. PATENT DOCUMENTS

| | | | |
|---|---|---|---|
| 3,619,256 | 11/1971 | Pepe et al. | 117/75 |
| 4,311,737 | 1/1982 | Ishizaka et al. | 427/387 X |
| 4,332,844 | 6/1982 | Hamada et al. | 427/412.1 |
| 4,471,007 | 9/1984 | Pate | 427/387 X |
| 4,486,565 | 12/1984 | Benjamin | 524/506 |
| 4,595,610 | 6/1986 | Fey et al. | 428/319.3 |

Primary Examiner—Thurman K. Page
Attorney, Agent, or Firm—Edward C. Elliott

[57] ABSTRACT

When a silicone elastomeric coating is applied over a polyurethane foam to protect it, an adhesion problem arises. It has been found that a coating of from 0.05 to 0.2 grams per square foot of surface of a silane of the formula $ZSi(OR)_3$, where Z is an amine functional radical and R is a monovalent hydrocarbon radical having from 1 to 6 carbon atoms, applied to the polyurethane foam under the silicone elastomeric coating greatly improves the adhesion between them. The silicone elastomeric coating is a particular type of tin catalyzed silicone coating comprising a particular organosilicon resin, a hydroxy-ended silicone polymer, and filler.

5 Claims, No Drawings

ADHESION OF SILICONE ELASTOMER TO POLYURETHANE

BACKGROUND OF THE INVENTION

1. Field of the Invention

This invention relates to silicone elastomeric coating applied to polyurethane foam.

2. Background Information

Silicone rubber is used to coat substrates to protect the substrate from the effects of the weather. Various methods have been discovered to aid in obtaining a good bond between the silicone rubber coating and the substrate. U.S. Pat. No. 3,619,256, issued Nov. 9, 1971, teaches a method which treats a substrate with a primer solution containing an omega-amino-organosilane and thereafter coating the primed substrate with a room-temperature-curable organopolysiloxane composition containing a silane compound having both an oxirane ring and a hydrolyzable group on the silane molecule. The silane compound will react with the primer composition and also act as a curing agent for the organopolysiloxane composition.

A primer composition is disclosed in U.S. Pat. No. 4,486,565, issued Dec. 4, 1984, for improving the adhesion of abrasion resistant polysiloxane coatings to plastic substrates. The primer composition contains a thermosettable acrylic resin, an aminofunctional organosilicon compound, and optionally an ultraviolet light screening compound.

U.S. Pat. No. 4,595,610, issued June 17, 1986, discloses a room temperature curing silicone for protecting polyurethane foam. The silicone coating comprises a particular organosilicon resin, an hydroxy-ended silicone polymer, fillers, and an organotin catalyst. It has now been found that this system does not develop a cohesive bond between the polyurethane foam and the silicone coating until a considerable amount of time has passed.

SUMMARY OF THE INVENTION

The adhesion of a silicone elastomeric coating to a polyurethane foam is improved by priming the surface of the polyurethane foam with an amine functional silane before applying the coating.

DESCRIPTION OF THE INVENTION

This invention relates to a method of improving the adhesion of a silicone elastomeric coating to a polyurethane substrate consisting essentially of applying to the polyurethane surface from 0.05 to 0.2 grams per square foot of surface of a silane of the formula $ZSi(OR)_3$ where Z is an amine functional radical and R is a monovalent hydrocarbon radical having from 1 to 6 carbon atoms, then applying a coating of a silicone elastomeric composition comprising the product obtained by mixing:

(A) from 1.0 to 400 parts by weight of the reaction product of
  (i) an organosilicon resin consisting essentially of $R''_3SiO_{1/2}$ units and $SiO_{4/2}$ units, wherein R'' represents a monovalent hydrocarbon radical, and the ratio of $R''_3SiO_{1/2}$ units to $SiO_{4/2}$ units is from 0.6/1 to 0.9/1, and
  (ii) a polyorganohydrogensiloxane;
(B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst.

One of the methods of upgrading roof coatings at the present time is the application of a layer of spray applied polyurethane foam. The sprayed layer of foam can be applied to a new roof substrate, or it can be applied over an old roof surface, such as asphalt shingles that have weathered to the point where they are no longer functioning to prevent access of water. The sprayed polyurethane foam fills and covers any cracks or openings in the roof surface, as well as providing a layer of very efficient insulation. Because the polyurethane is not resistant to sunlight, it must be protected by a covering. One of the most acceptable coverings is based upon silicone elastomeric coatings. These coatings are very weather resistant and provide long time protection from the sunlight. A problem has developed, however, in that the adhesion between the polyurethane layer and the silicone layer is slow to develop. It is necessary that the silicone coating be firmly adhered to the polyurethane because of the forces trying to remove the protective coating from the polyurethane, such as wind and rain during storms. If the adhesion between layers is insufficient, strong winds will cause the silicone layer to be stripped from the polyurethane, exposing the polyurethane to degradation from sunlight. Another difficulty has been discovered in that the silicone layer is also required to protect the polyurethane from burning when exposed to fire. If there is not sufficient adhesion between the polyurethane and the silicone layers during fire tests, the force of the flames peels the silicone layer from the polyurethane layer and then the polyurethane burns. When the silicone layer is firmly attached to the polyurethane, the flame can not reach the polyurethane and the roof covering does not burn.

It has been discovered that different polyurethane foams provide different adhesion results when covered with silicone elastomeric coatings. Adhesion is developed in most cases if enough time for full cure is present, but in some cases the time required is as long as several weeks or months. During this time, the coating is subjected to being peeled loose if subjected to strong winds or rain, for example. A need for a rapid development of strong adhesion was evident. The method of this invention was developed to provide for this need.

The improved adhesion of the silicone elastomeric composition to the polyurethane foam is due to the use of the silane of the formula $ZSi(OR)_3$ where Z is an amine functional radical and R is a monovalent hydrocarbon radical having from 1 to 6 carbon atoms. Z is preferably of the formula $H_2N(CH_2CH_2NH)_y(CH_2)_z$— where y is 0 or 1, and z is an integer of 1 to 6 and preferably 3 or 4. R is preferably an alkyl group such as methyl, ethyl, propyl, and butyl, with methyl and ethyl most preferred.

Illustrative of such aminosilanes are aminomethyltriethoxysilane, gamma-aminopropyltriethoxysilane, gammaaminopropyltrimethoxysilane, N-beta(aminoethyl)-gammaaminopropyltrimethoxysilane, and the like. Preferred are gamma-aminopropyltriethoxysilane and gamma-aminopropyltrimethoxysilane. The method of manufacture of such silanes is well known. Many of such silanes are commercially available.

A curable silicone composition for the protection of polyurethane foam has been described in U.S. Pat. No.

4,595,610, issued June 17, 1986, to Fey and Lefler, III, said patent being incorporated by reference to describe the silicone elastomeric composition used in this invention and the method of making it. The silicone coating comprises a particular organosilicon resin, any hydroxy-ended silicone polymer, fillers, and an organotin catalyst.

Component (A) of the silicone elastomeric composition is disclosed in U.S. Pat. No. 4,310,678, issued Jan. 12, 1982 to Blizzard and Swihart and assigned to the assignee of the present invention. The specification of U.S. Pat. No. 4,310,678 is hereby incorporated by reference into the present specification to describe component (A) of the silicone elastomeric composition and to teach methods of manufacturing it.

Component (B) of the silicone elastomeric composition is a polydiorganosiloxane having the general formula $HO(R'_2SiO)_xH$, wherein R' represents a monovalent hydrocarbon radical and x has a value of from 10 to 1000. Preferably R' is selected from the group consisting of phenyl radicals and lower alkyl radicals such as methyl, ethyl, propyl, and butyl radicals. More preferably, most or all of the R' radicals are methyl radicals. When x has a value of 10, the viscosity of component (B) is about 0.04 Pa.s at 25° C. When x has a value of 1000, the viscosity is about 80,000 Pa.s at 25° C.

The synthesis of polydiorganosiloxanes as described above, from more basic starting materials, is quite well known and many such materials are commercially available.

Component (C) is a filler selected from the known fillers for curable silicone compositions. The filler can be treated with conventional organosilicon treating agents which are well known in the art. Examples of useful fillers include crushed quartz, aluminum oxide, aluminum silicate, zirconium silicate, magnesium oxide, zinc oxide, talc, diatomaceous earth, iron oxide, calcium carbonate, clays, titania, zirconia, mica, glass, sand, carbon black, graphite, barium sulfate, zinc sulfate, wood flour, cork, and fluorocarbon polymer powder among others. Especially preferred are combinations of carbon black and titania.

The organotin catalyst, Component (D), is a member of a class of condensation catalysts that is well known in the art. The organotin catalyst can be, for example, a tin salt of a carboxylic acid, such as stannous lactate, stannous linoleate, stannous maleate, stannous octoate, stannous oleate, or stannous stearate; an alkyl tin salt of a carboxylic acid such as dibutyltindilaurate, dibutyltindiacetate, a dipropyltindilaurate; or the organotin catalyst can be a more complex species such as an organothiotin complex, amino substituted organotin carboxylate, and the like. Dibutyltindilaurate and dibutyltindiacetate are preferred organotin catalysts.

A dilute solution of the amine functional silane is applied to the polyurethane foam surface in an amount sufficient to leave from 0.05 to 0.2 grams of primer per square foot of surface. Less than this amount does not give the cohesive adhesion required by the application, particularly if the primer is allowed to age, as for two or three days before the silicone elastomeric coating is applied. More than this amount causes the primer to build up a crust on the surface and adhesion failure in the primer layer occurs. The concentration of the primer solution and the amount of primer solution applied are related in that more dilute solutions can be applied in heavier coatings and still give the desired amount of primer on the surface. More concentrated primer solutions, of course, must be applied in lighter coatings. In practice, it has been found preferable to use a concentration of primer to solvent of about 1:30 to 1:50 by weight. The preferred coating is about 0.1 gram of primer per square foot of surface.

The solution of silane is allowed to dry, usually about one hour is sufficient, but of course the required time depends upon the weather conditions. The silicone elastomeric coating is then applied and allowed to cure. Preferably the silicone elastomeric coating is applied by spraying in two layers with drying between layers. The spraying is done at 90 degrees to each other to give a more uniform, pin hole free coating. Following the method of this invention results in the development of cohesive adhesion of the silicone elastomeric coating to the polyurethane foam within 24 hours.

The following Examples are presented to further illustrate the present invention. Parts and percentages are by weight unless otherwise specified.

EXAMPLE 1

A series of primers were prepared by mixing 1 gram of the material shown in Table I with the amount of toluene shown in the table. Each of the primers was then wiped lightly on the surface of a polyurethane foam. After ten minutes air drying time, each surface was coated with a silicone elastomeric coating. After three hours cure time, the adhesion of the coating to the primed surface was evaluated by peeling the coating by hand from the surface. The results, shown in Table I, show that the primer A, falling within the scope of this invention, gives cohesive failure, while the other primer B, not falling within the invention, provides only adhesive failure.

The silicone elastomeric coating material was prepared by mixing 35 parts of a part A consisting of the reaction product of 31 parts of polymethylhydrogensiloxane and 69 parts of a solid, benzene soluble resin copolymer consisting essentially of $Me_3SiO_{1/2}$ units and $SiO_{4/2}$ units where Me is a methyl radical, there being about 0.7 $Me_3SiO_{1/2}$ units for every $SiO_{4/2}$ unit; 63 parts of a part B consisting of a mixture of 30 parts of hydroxyl endblocked polydimethylsiloxane having a viscosity of about 45 Pa.s at 25° C., 30 parts of a hydroxyl endblocked polydimethylsiloxane having a viscosity of about 14 Pa.s at 25° C., 9 parts of titanium dioxide pigment, 0.8 parts of hydrogeneated castor oil thickener and 30 parts naphtha; and 2 parts of a part C consisting of dibutyltindiacetate.

TABLE I

| Primer | Toluene, g | Adhesion |
| --- | --- | --- |
| A | 10 | cohesive |
| A | 5 | cohesive |
| B* | 10 | adhesive |
| B* | 5 | adhesive |

*comparative
A = gamma-aminopropyltrimethoxysilane
B = 15 percent solids solution in naphtha of equal parts of normal propylorthosilicate, methyl cellosolveorthosilicate, and tetrabutyltitanate.

EXAMPLE 2

Primer mixtures were prepared at different solids ratios to evaluate the effect upon adhesion.

The materials shown in Table II, 10 grams, were mixed with the amount of toluene shown in the table and then applied to polyurethane foam by spraying a light coating over the foam. After drying, half of each panel was sprayed with water to simulate dew. This was dried for 30 minutes at 70° C. then each panel was coated with a silicone coating as in Example 1. After 24 hours, the adhesion was evaluated with the results shown in Table II.

TABLE II

| Additive | Toluene | | Adhesion | |
|---|---|---|---|---|
| | grams | ratio | Dry | Water Sprayed |
| A | 100 | 1:10 | 100% Coh | 100% Coh |
| A | 150 | 1:15 | 100% Coh | 100% Coh |
| A | 200 | 1:20 | 100% Coh | 100% Coh |
| C | 100 | 1:10 | 100% Coh | 100% Coh |
| C | 150 | 1:15 | 100% Coh | 100% Coh |
| C | 200 | 1:20 | 100% Coh | 100% Coh |
| C | 300 | 1:30 | 100% Coh | 100% Coh |
| C | 400 | 1:40 | 50% Coh | 50% Coh |
| C | 500 | 1:50 | 50% Coh | 50% Coh |
| none | | | nil | nil |

A = gamma-aminopropyltrimethoxysilane
C = gamma-aminopropyltriethoxysilane

That which is claimed is:

1. A method of improving the adhesion of a silicone elastomeric coating to a polyurethane substrate consisting essentially of applying to the polyurethane surface from 0.05 to 0.2 grams per square foot of surface of a silane of the formula $ZSi(OR)_3$ where Z is an amine functional radical and R is a monovalent hydrocarbon radical having from 1 to 6 carbon atoms, then applying a coating of a silicone elastomeric composition comprising the product obtained by mixing:

(A) from 1.0 to 400 parts by weight of the reaction product of
  (i) an organosilicon resin consisting essentially of $R''_3SiO_{1/2}$ units and $SiO_{4/2}$ units, wherein R" represents a monovalent hydrocarbon radical, and the ratio of $R''_3SiO_{1/2}$ units to $SiO_{4/2}$ units is from 0.6/1 to 0.9/1, and
  (ii) a polyorganohydrogensiloxane;
(B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst.

2. The method of claim 1 in which the silane is of the formula $H_2N(CH_2CH_2NH)_y(CH_2)_z$—where y is 0 or 1, and z is an integer of 1 to 6.

3. The method of claim 2 in which the silane is gamma-aminopropyltriethoxysilane.

4. The method of claim 2 in which the silane is gamma-aminopropyltrimethoxysilane.

5. The laminate of polyurethane, silane and silicone elastomeric composition obtained by the method of claim 1.

* * * * *